UNITED STATES PATENT OFFICE.

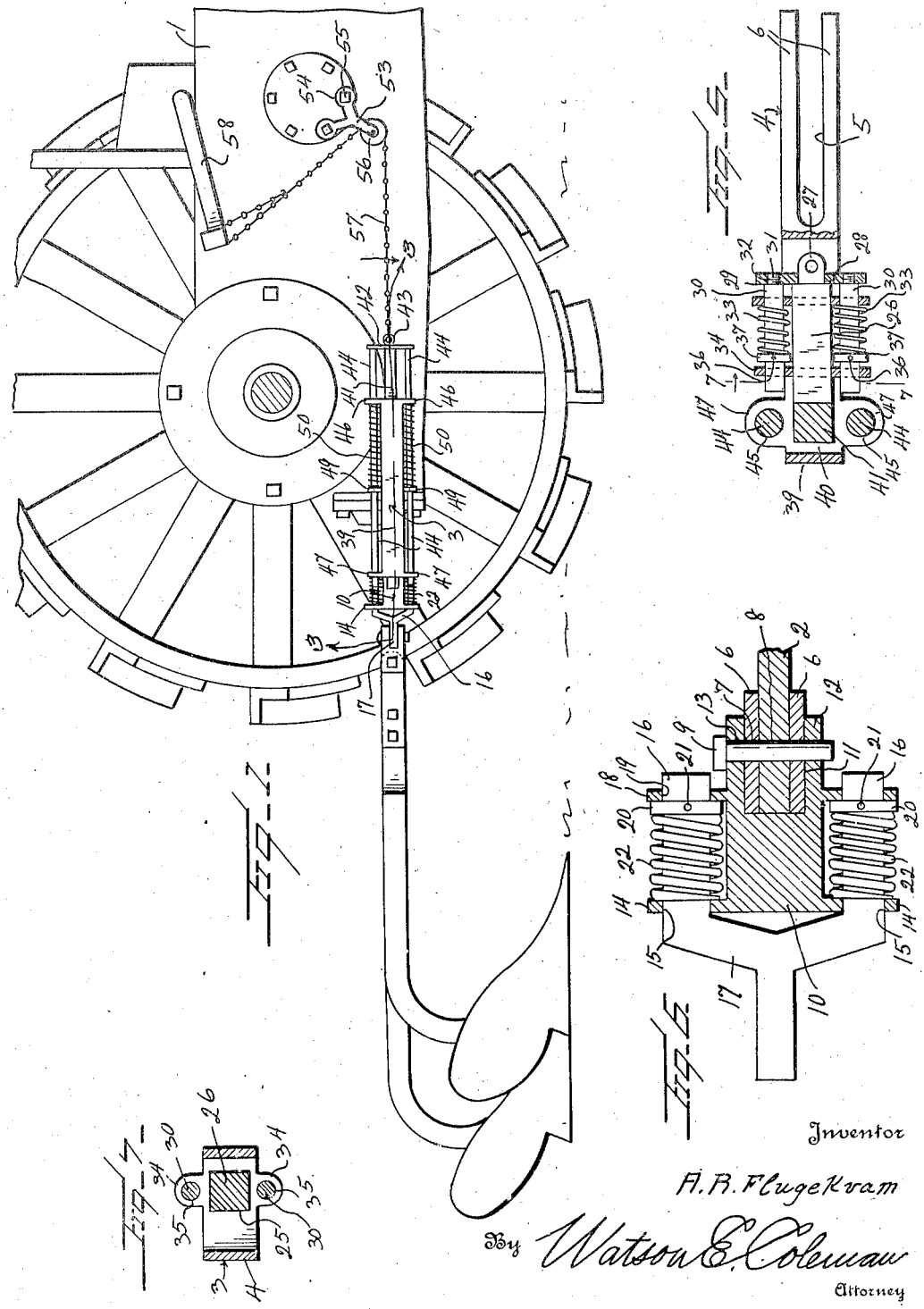

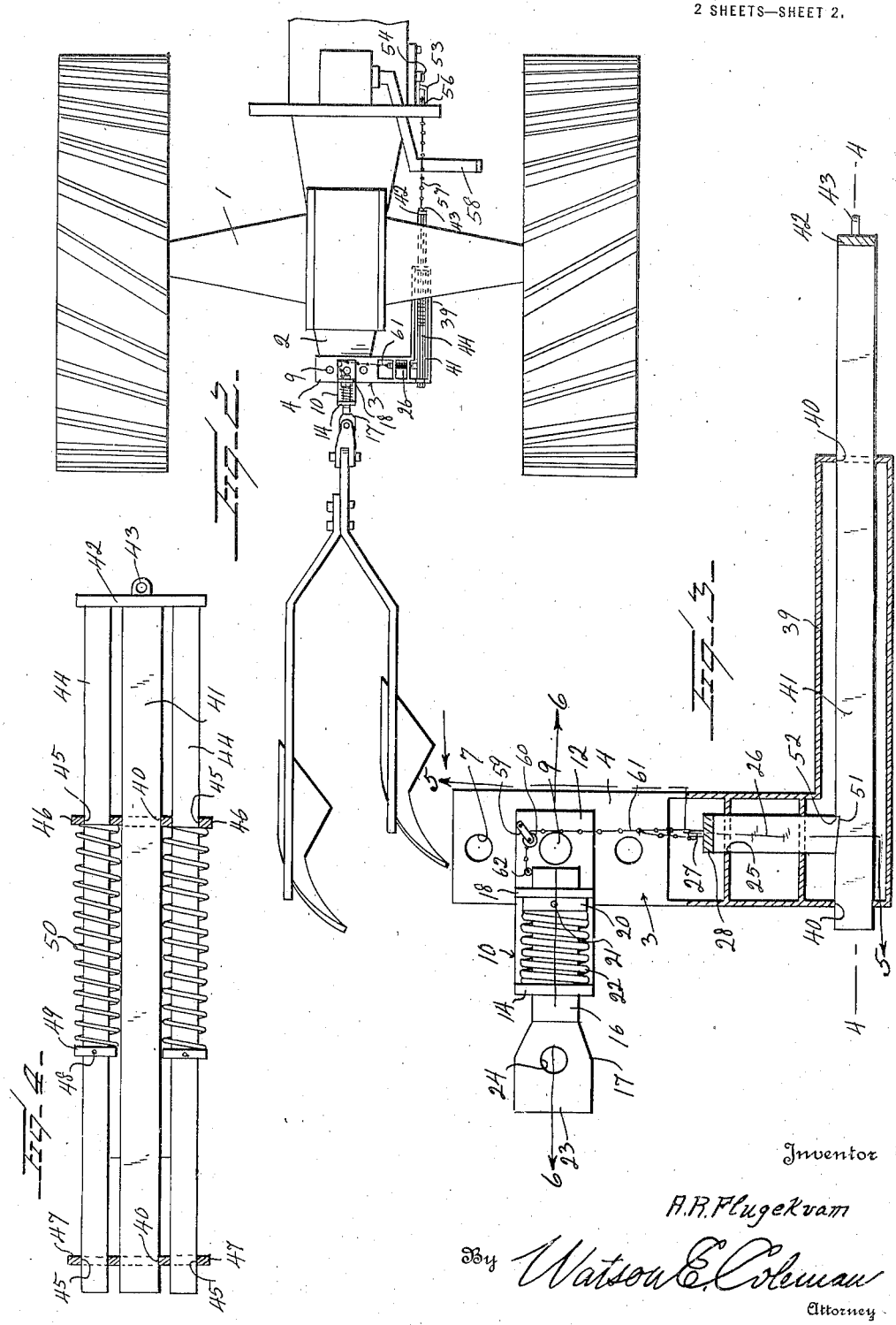

ALMER R. FLUGEKVAM, OF FAIRDALE, NORTH DAKOTA.

AUTOMATIC CLUTCH-RELEASE.

1,372,413.        Specification of Letters Patent.    Patented Mar. 22, 1921.

Application filed January 17, 1920. Serial No. 352,146.

*To all whom it may concern:*

Be it known that I, ALMER R. FLUGEKVAM, a citizen of the United States, residing at Fairdale, in the county of Walsh and State of North Dakota, have invented certain new and useful Improvements in Automatic Clutch-Releases, of which the following is a specification, reference being had to the accompanying drawings.

This invention relates to an improved automatic clutch releasing device for Fordson tractors, and an object of the invention is to provide a device of this kind, which is simple in construction, efficient and practical in use, and one which can be manufactured for a relatively low cost and sold at a reasonable profit.

Another object of the invention is to provide an automatic clutch releasing device, so mounted on the tractor and connected to the clutch pedal, so that when an obstruction is in the path of that which is drawn by the tractor, such as a plow or the like, the device is actuated automatically to release the clutch of the tractor, and thus avoid injury to either the plow or the tractor or stalling the motor, and also prevent the tractor from tilting rearwardly.

A further object of the invention is to provide an automatic releasing device comprising spring actuated means for releasing the clutch pedal, a spring actuated detent for the spring actuated clutch releasing means, and means of connection between the detent and that which is drawn by the tractor, to operate the detent, when the tensioning elements of the connecting means are overcome, by the plow or that which is drawn by the tractor, comes in contact with an obstruction in its path, whereby the clutch pedal may be released and thus avoid injury to either the plow or the tractor.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of a conventional form of Fordson tractor, showing the clutch pedal, and illustrating a portion of the gang plow in the rear of the tractor and showing the clutch releasing device as applied to the draw bar and connecting between the clutch pedal and the gang plow.

Fig. 2 is a plan view of Fig. 1,

Fig. 3 is a longitudinal sectional view on line 3—3 of Fig. 1, showing the parts in sectional plan and on an enlarged scale.

Fig. 4 is a sectional view on line 4—4 of Fig. 3,

Fig. 5 is a sectional view on line 5—5 of Fig. 3,

Fig. 6 is a sectional view on line 6—6 of Fig. 3,

Fig. 7 is a sectional view on line 7—7 of Fig. 5.

Referring more especially to the drawings, 1 designates a conventional form of Fordson tractor, the rear end of which is provided with a draw bar 2, to which a plow or any other device is adapted to be ordinarily connected so as to be drawn by the tractor.

The automatic releasing device includes a frame 3, which, in plan view, is of the shape shown. The arm 4 of this frame is provided with a bifurcation 5, and the forks 6 caused to be formed by the bifurcation straddle the draw bar 2. These forks 6 are provided with a plurality of openings 7, which, when the forks 6 straddle the draw bar, register with the openings 8 in the draw bar, in order to receive a suitable holding bolt 9.

A clevis casting 10 is provided, and which is bifurcated as shown at 10. The forks 12 of this clevis casting, caused to be formed by the bifurcation 11 straddle the forks 6 of the frame 3 and said holding bolt or pin 9 is passed through the openings 13 of the forks 12, in order to attach or connect the clevis casting to the frame 3 and the draw bar. The rear end of the clevis casting is provided with lateral flanges or ears 14, which are provided with guide openings 15, through which the parallel arms 16 of the clevis proper 17 are guided. Projecting from the forks 12 of the clevis casting are flanges or ears 18 also having guide openings 19, through which the parallel arms 16 of the clevis proper are guided. The arms 16 have secured thereto by means of pins 21, rings 20, between which and the flanges or ears coil springs 22 are interposed. These coil springs are in surrounding relation to the arms 16, and are heavy and of sufficient tension to readily withstand the usual load to be drawn by the tractor, for instance, a load such as a gang plow or the like. The clevis proper 17 has a rearwardly extending leg 23 provided with an opening 24, to which any suitable gang plow or the like may be connected, in order to be drawn by the tractor.

The frame 3 has its rear transverse arm 4 provided with guide openings 25, in which a detent or holding member 26 is mounted. The guides 25 and the detent are correspondingly rectangular in cross section, and one end of the detent 26 has a reduced apertured ear 27, which projects through an opening 28 in a plate 29. This plate 29 acts as a cross head or cross bar. Guide pins 30 are connected to the plate or cross bar or head 29 by means of the reduced threaded extensions 31 engaging in the threaded openings 32 of said plate. These guide pins 30 are preferably cylindrical, though not necessarily, and arranged in surrounding relation to the pins are coil springs 33. The parts having the guide opening 25 of the transverse arm 4 of the frame 3 are provided with upwardly and downwardly extending ears 34 provided with guide openings 35, which receive the pins 30. Secured upon the guide pins by the holding pins 36 are collars or flanges 37. The coil springs 33 are interposed between the collars or flanges 37 and certain of the ears 34 act to hold the detent 36 normally in the position shown in the sectional plan view of Fig. 2.

The frame 3 has a forwardly extending arm 39, the forward and rear ends of which are provided with guide openings 40 in which the releasing plunger 41 is guided. The guide openings 40 and the releasing plunger 41 are correspondingly rectangular in cross section, to insure guiding the plunger and to insure against rotation of the same. The forward end of the plunger is carried in any suitable manner by the cross head plate 42, which is provided with an eye 43. This cross head plate also carries the cylindrical guide rods 44, which are mounted in the guide openings 45 of the upwardly and downwardly extending ears 46 and 47 of the forward and rear ends of the arm 39 of the frame 3. The guide rods 44 have secured thereto by means of the pins 48, suitable collars or flanges 49. Interposed between the collars or flanges 49 and the lateral ears 46 are coil springs 50. The releasing plunger 41 has a notch 51 corresponding in shape to and adapted to receive the nose 52 of the detent or holding member 26 so as to hold the plunger 41 in its normal position as shown in the sectional plan view of Fig. 2.

A pulley supporting bracket 53 having a washer-like end 54 is fitted on a bolt 55 of the side of the tractor, and carried by the bracket 53 is a pulley 56. A suitable chain, cable or the like 57 passes over this pulley, and has one end attached to the eye 43 of the cross head plate 42, and its other end is connected to the usual or conventional form of clutch pedal 58. This chain or other connection is of a length to fit exactly between the eye 43 and the clutch pedal, when in gear, and when the plunger 41 is in its forward normal position greatly under the tension of the springs 50, and particularly when the nose 52 of the detent 26 is in engagement with the notch 51, so as to hold the parts in such operative positions. Carried in any suitable manner, preferably by a small clevis 59, though not necessarily, on one of the forks of the clevis casting is a small pulley 60. A chain 61 has one end attached to the apertured ear or lug 27 of the detent 26, and is passed over the pulley 60, and has its other end connected to an eye 62 of one of the arms 16. It is obvious that this chain, or the like 61 may be lengthened or shortened, whereby the clevis casting may be attached in straddled position with relation to the forks 6 so that any one of the bolts 9 may attach the clevis casting in place. In other words, the clevis casting may be adjusted laterally, and in such an instance any one of the bolts 9 may be used for connecting the clevis casting in place. When this casting is adjusted in this manner, it is necessary to lengthen or shorten the chain 61, so that it will be taut at all times between its points of connection with the detent and an eye 62. The bracket which holds the pulley 56 is designed to be attached to two of the bolts 55, and is positioned so as to dispose the pulley on a direct line with the action of the plunger 41, thereby facilitating the resetting of the device, by pulling up on the clutch pedal.

As previously stated, the springs 22 are designed to be very heavy, and of considerable tension, greater than the load to be drawn by the rear leg of the clevis 17, so that as long as the load, such as a plow does not meet with any obstructions in its path, the detent 26 will remain in engagement with the notch 51 and hold the plunger 41 in its proper normal position. However, when the plow or other apparatus meets with an obstruction in its path, a sufficient pull is imparted on the clevis 17 to overcome the action of the springs 22, thereby pulling upon the chain 61 and causing a lateral movement on the detent 26 against the action of the springs 33. In other words, the detent is disengaged from its notch 51 after which the plunger 41 is free to operate under the action of the springs 50. The springs 50 will expand causing a rearward pulling action upon the chain 57, pulling out the clutch pedal and stopping the tractor. The operator may then clear the plow of the rock or other obstruction in the path of the plow, reset the device, slip in the gears and proceed with the further operation of the tractor and the plow. This may all be accomplished without the operator leaving the seat of the tractor. By means of this device the need of wooden brake pins is unnecessary in the beam of a plow. Also the risky practice of operating the tractor and the plow with an iron bolt in place of a wooden break pin, is avoided. Also the tractor is prevented from tipping over backward on a sudden pull. Furthermore, the chain 61 may be varied in length, so that the amount of strain required to operate the device will be varied. In other words, by having this chain sufficiently long so that it will be a little slack when the device is set will necessitate considerable of a pull on the clevis to operate the device. In further words, there are some obstructions, such as rocks, or stumps or hardened soil that it would be unnecessary to stop the tractor and while these smaller obstructions would operate the device, should the chain 61 be taut, the operator may slacken the chain so that the plow will pass over such obstructions and the tractor will not be stopped. However, the chain 61 may be lengthened or shortened, or made taut or slack, to suit the operator. The plunger 41, as well as the detent are easily removable, and furthermore, the nose 52 of the detent and the notch 51 of the plunger are to be made of any suitable material, preferably case hardened steel, so as to withstand the greatest amount of wear. In order to reset the device, it is only necessary to place the tractor in a neutral position and pull up the tractor clutch pedal. This will bring the plunger back to its normal position under the tension of the springs 50 as previously stated, and when this occurs the detent will slip into engagement with the notch 51.

This invention having been set forth, what is claimed as new and useful is:—

1. The combination with a tractor having a clutch operating mechanism including a clutch pedal, of a farming machine attaching device provided with adjustable connections to the draw bar of the tractor, said adjustable connections including yieldable means adapted to resist the ordinary pull of a farming machine, a spring tensioned member having positive operative connections with the clutch pedal and provided with a notch, a spring tensioned detent dog having an operative connection with a member of the yieldable means of the adjustable connection with the draw bar and adapted to engage said notch for holding the member set against the action of its spring means when the clutch is in gear, whereby when an excessive pull is imparted on the attaching device the detent dog is disengaged from the notch allowing the spring tensioned member to actuate said mechanism to release the clutch.

2. The combination with a tractor having a clutch operating mechanism including a clutch pedal, of a frame having a part adjustably connected to the draw bar of the tractor, a spring tensioned member slidable in bearings of said frame and being positively connected with the clutch pedal, said member having a notch, a yieldable couple to be carried by a farming machine and provided with adjustable connections with the frame and the draw bar and adapted to resist the ordinary pull of the farming machine, a detent dog slidable in bearings of the frame and having its nose engaging the notch of said member to hold it set against the action of its spring means when the clutch is in gear, and positive means operatively connecting the detent dog and a member of the yieldable couple, whereby upon an excessive pull imparted on the couple, the detent dog will disengage the notch and allow the spring tensioned member to actuate said mechanism to release the clutch.

3. The combination with a tractor having a clutch operating mechanism including a clutch pedal, of a right angle frame having one arm thereof adjustably connected to the draw bar of the tractor, a spring tensioned member slidable in bearings of the other arm of the frame, positive means connecting said member and the clutch pedal, a yieldable couple to be carried by a farming machine and being adjustably connected to the first arm of the frame and the drawbar whereby the farming machine may be adjusted laterally relatively to the tractor, a spring tensioned detent dog slidable in bearings of the first arm of the frame and detachably engaging said member to hold the same set against the action of its spring means when the clutch is in gear, and means operatively connecting the detent dog and a member of the yieldable couple whereby upon an excessive pull imparted on the couple the detent dog will disengage said member and allow it to actuate under the action of its spring means to operate said mechanism to release the clutch.

In testimony whereof I hereunto affix my signature.

ALMER R. FLUGEKVAM.